United States Patent [19]

Murata et al.

[11] Patent Number: 4,465,254
[45] Date of Patent: Aug. 14, 1984

[54] STRUCTURE FOR FITTING A TANK FOR AN AUTOMOTIVE VEHICLE

[75] Inventors: Masanori Murata, Yokohama; Yutaka Takada, Fujisawa, both of Japan

[73] Assignee: Nissan Motor Company, Limited, Yokohama, Japan

[21] Appl. No.: 387,276

[22] Filed: Jun. 10, 1982

Related U.S. Application Data

[63] Continuation of Ser. No. 125,457, Feb. 28, 1980, abandoned.

[30] Foreign Application Priority Data

Mar. 8, 1979 [JP] Japan .............................. 54-28624[U]

[51] Int. Cl.³ .............................................. A47K 1/08
[52] U.S. Cl. ................................ 248/311.2; 248/154; 248/313
[58] Field of Search ................. 248/154, 311.2, 313, 248/312, 312.1; 224/42.45

[56] References Cited

U.S. PATENT DOCUMENTS

| | | | |
|---|---|---|---|
| 1,218,056 | 3/1917 | Cole | 224/42.46 R |
| 1,487,372 | 3/1924 | Cobel | 248/311.2 |
| 1,929,562 | 10/1933 | Pierce | 248/20 |
| 2,325,712 | 8/1943 | Shurmur | 248/312.1 X |
| 2,335,955 | 12/1943 | Nordstrom | 248/154 |
| 2,626,119 | 1/1953 | Crosby | 248/311.2 |
| 2,659,443 | 11/1953 | Zabriskie | 248/312 UX |
| 2,681,164 | 6/1954 | Kalfen | 248/311.2 |
| 2,784,931 | 3/1957 | Martin | 248/313 |
| 2,891,753 | 6/1959 | Bittle | 248/154 |
| 3,212,660 | 10/1965 | Adell | 215/1 |
| 3,212,661 | 10/1965 | Adell | 215/1 |
| 3,335,955 | 8/1967 | Palfreyman | 238/283 |
| 3,473,772 | 10/1969 | Nilson | 248/214 |
| 3,614,982 | 10/1971 | Krizman | 248/311.2 |
| 3,737,133 | 6/1976 | Boecker | 248/313 |
| 3,917,202 | 11/1975 | Reinwall et al. | 248/68 |

FOREIGN PATENT DOCUMENTS

| | | |
|---|---|---|
| 7317224 | 10/1973 | Fed. Rep. of Germany . |
| 656197 | 4/1929 | France . |
| 685504 | 7/1930 | France . |
| 694882 | 12/1930 | France . |
| 1149609 | 12/1957 | France . |
| 2204954 | 5/1975 | France . |
| 2386713 | 11/1978 | France . |
| 352504 | 7/1931 | United Kingdom . |
| 504975 | 5/1939 | United Kingdom . |
| 737003 | 9/1955 | United Kingdom . |
| 1137003 | 12/1968 | United Kingdom . |
| 1177281 | 1/1970 | United Kingdom . |
| 1341645 | 12/1973 | United Kingdom . |
| 1391397 | 4/1975 | United Kingdom . |
| 1447396 | 8/1976 | United Kingdom . |
| 1504329 | 3/1978 | United Kingdom . |

Primary Examiner—J. Franklin Foss
Attorney, Agent, or Firm—Lane, Aitken & Kananen

[57] ABSTRACT

A structure for fitting a tank in an engine compartment of a vehicle body comprises a bracket for fixing the tank at its top portion relative to the vehicle body, and means for positioning the tank at its bottom portion in its longitudinal and lateral directions relative to the vehicle body.

12 Claims, 10 Drawing Figures

STRUCTURE FOR FITTING A TANK FOR AN AUTOMOTIVE VEHICLE

This application is a continuation, of application Ser. No. 125,457, filed Feb. 28, 1980 now abandoned.

BACKGROUND OF THE INVENTION

The present invention relates to a structure for attaching a tank for an automotive vehicle, for example, such as a window washer tank, a reserve tank for engine-cooling water, a head lamp washer tank or the like which are arranged in an engine compartment thereof.

FIGS. 1 through 3 show a conventional structure for attaching a resin tank such as a window washer tank T. The engine compartment R has a plurality of vertical walls therein. On of such vertical walls is a vertical plate 5 such as a hood ledge. A channel-shaped bracket 6a is attached to the vertical plate 5 by screw means. A V-shaped engaging groove 7 is formed in the bracket 6a. The stopper 8 fixed on the back side of the resin tank T is fitted into the engaging groove 7.

FIG. 4 shows another conventional structure for fitting the resin tank in the engine compartment wherein the bracket 6b is attached in a cantilever form onto a vertical wall (not shown).

FIG. 5 shows still a further conventional structure for attaching the resin tank for use in an automotive vehicle. The resin tank T has a plurality of projections 9 formed on the side wall thereof by which the tank is fixed directly on a vertical wall (not shown) by screw means without bracket means.

In all of the above-stated conventional structures, the vertical plate 5 such as a food ledge is used as attaching means.

However, the number of parts to be arranged in the engine compartment R has recently increased because of countermeasures for exhaust gas, electric gas injectors (EGI) or the like. For example, many parts such as a battery and relay box are fixed to the vertical plate 5 such as a hood ledge which pertitions the engine compartment. In addition, other parts such as harness, wire and tube are fixed on the vertical plate 5. As a result, it is difficult to secure a large space for the arrangement of the resin tanks T such as a window washer tank and head lamp washer tank within a restricted space of the engine compartment. If the capacity of a tank is more than 1 liter, it becomes extremely difficult to arrange properly the tank within the engine compartment.

SUMMARY OF THE INVENTION

Therefore, it is an object of the present invention to provide a structure for attaching a tank within an engine compartment of an automotive vehicle wherein a desired capacity of tank can be effectively fitted within a restricted space of the engine compartment.

Because all parts are fixed to only a vertical plate such as a hood ledge which partitions the engine compartment in the conventional structures, it becomes difficult to secure a reasonable space for the arrangement of plural tanks in the engine compartment. The tanks can be arranged in other ways. For example, the tanks can be formed of a vertical-type or horizontal-type so as to increase the capacity thereof in such a way that each tank does not interfere with such parts as harness, wire, tube and others which are fixed on the vertical plate and that the tank is placed between the other parts.

Consequently, according to the present invention, a structure for attaching a tank in an engine compartment of an automotive vehicle comprises a bracket for fixing the tank at its top portion relative to the vehicle body, and means for positioning the tank at its bottom portion in its longitudinal and lateral directions relative to the vehicle body.

DETAILED DESCRIPTION OF THE PREFERRED EMBODIMENTS

Figure 6:
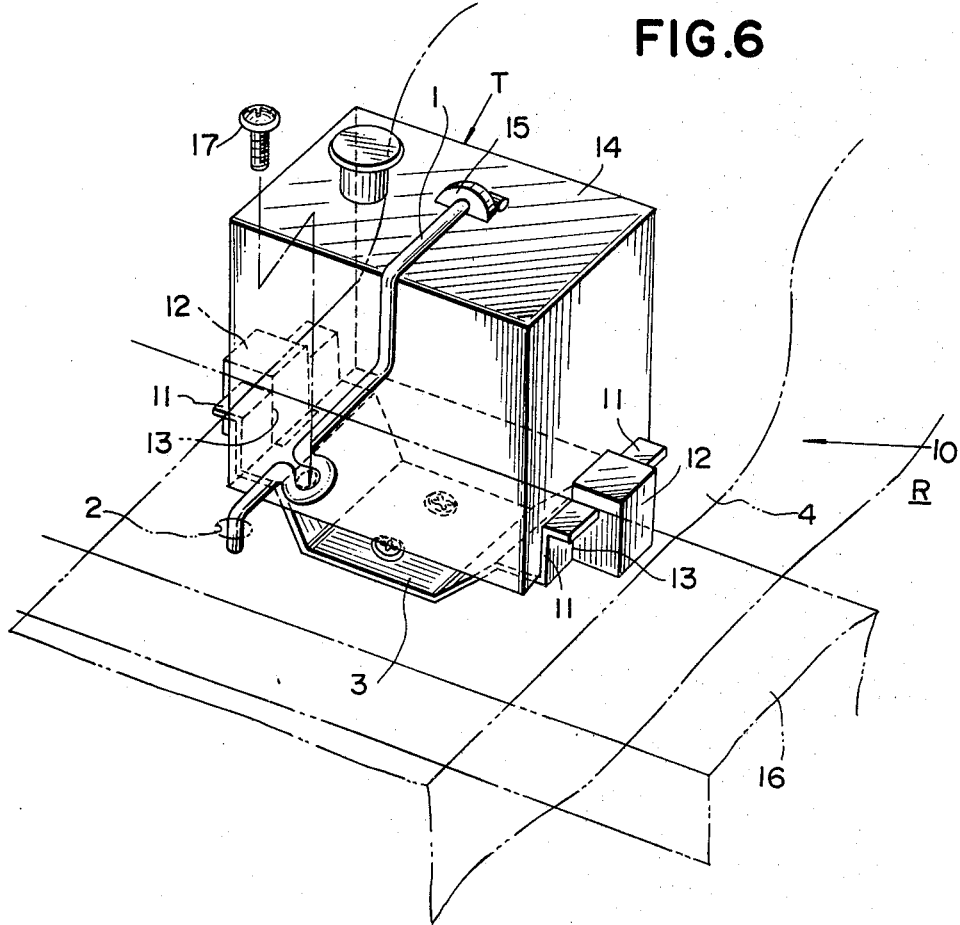
FIG. 6 is a schematic perspective view showing a structure for arranging a window washer tank in an engine compartment according to a first embodiment of the present invention.
Figure 7:
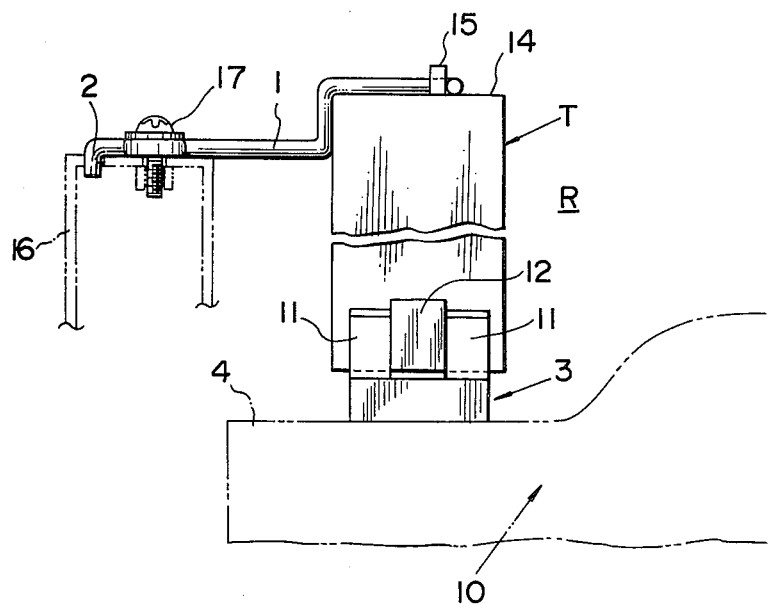
FIG. 7 is a schematic side view of the fitting structure as shown in FIG. 6.

FIGS. 6 and 7 show a first embodiment of the present invention. A hood ledge is designated generally by the numeral 10. The hood ledge 10 is so designed as to partition the engine compartment R. A bracket 3 made by bending a metallic plate is fixed to the horizontal wall 4 of the hood ledge 10 by screw means. The ends of the bracket 3 are bent to form an erecting portion 11, respectively, for holding a tank T which is made of a synthetic resin or the like. When the tank T is held between both erecting ends 11 of the bracket 3, it is properly positioned in its longitudinal direction. Each erecting end 11 is forked so as to form a notched portion 13 in a channel shape. A projection 12 is formed on each side wall of the tank T at its lower portion. When these projections 12 are inserted into the notched portions 13 of the erecting ends 11 of the bracket 3, respectively, the tank T is properly positioned in its lateral direction. Another projection 15 is formed on the upper surface 14 of the tank T. A bracket made by bending a rod is generally designated by the numeral 1. An intermediate portion of the bracket 1 is fixed by means of a screw 17 on the upper surface of a radiator core support 16 arranged on the vehicle body (not shown). The top end of the bracket 1 is fitted to the fixed projection 15 on the upper surface 14 of the resin tank T so that it is provided fixedly within the engine compartment R.

An exit portion (not shown) of the liquid in the tank T can be employed in place of the projections 12 on the side walls of the tank T. In such a case, the configuration of the tank T can be more simplified.

In the first embodiment, the lower end of the bracket 1 is inserted into an engaging hole 2 formed in the radiator core support 16 whereby the bracket 1 can be prevented from rotating around the screw 17 when the tank T is to oscillate in its longitudinal direction.

It is preferable that the bracket 1 is made of a strong resilient material such as a piano wire so that it can absorb its vibration or oscillation caused by the vehicle body even if the tank T is filled with the liquid such as a cleaning liquid.

According to the first embodiment of the present invention as above-stated, it is easy to place the tank T in position in the engine compartment R, by providing a space corresponding to the tank T on the horizontal portion 4 of the hood ledge 10 or others within the engine compartment R. The positioning bracket 3 is previously fixed on the horizontal portion 4, and the lower portion of the tank T is inserted into the bracket 3. After the tank T is placed in position, the top end of the bracket 1 sits onto the upper surface 14 of the tank T. Finally, the bracket 1 is fixed at its bottom end to the upper surface of the radiator core support 1b so that the tank T is properly arranged within the engine compartment.

Figure 8:
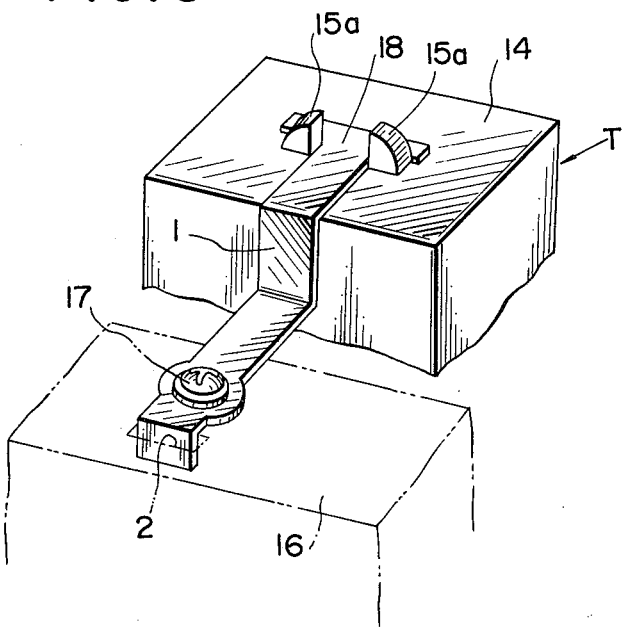
FIG. 8 is a perspective view showing the upper portion of a tank and its related construction according to a second embodiment of the present invention.

FIG. 8 shows a second embodiment of the present invention. The bracket 1 fixed on the top of the tank T is made of a metallic, synthetic resin, or other plate. A pair of projections 15a protrudes from the top surface 14 of the tank T. The T-shaped portion 18 formed at the top end of the bracket 1 is to be held between the pair of projections 15a on the upper surface 14 of the tank T. As shown in FIG. 8, the bracket 1 resiliently presses the tank T downwards. An intermediate portion of the bracket 1 is fixed to the radiator core support 16 by the screw 17 and the lower end of the bracket 1 is inserted into a hole 2 formed in the radiator core support 16 while the tank T is positioned at its bottom portion in the same manner as in the first embodiment.

Figure 9:
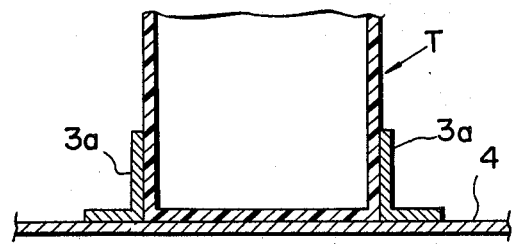
FIG. 9 is a sectional view showing the lower portion of a tank and its related construction according to a third embodiment of the present invention.

FIG. 9 illustrates a third embodiment of the present invention wherein a modified form of the positioning bracket 3 is employed. Two pairs of L-shaped brackets 3a are welded on the horizontal wall 4 such as a hood ledge in the opposite directions to each other. The tank T is positioned in a rectangular space defined by the four L-shaped brackets 3a on the horizontal wall 4.

Figure 1:
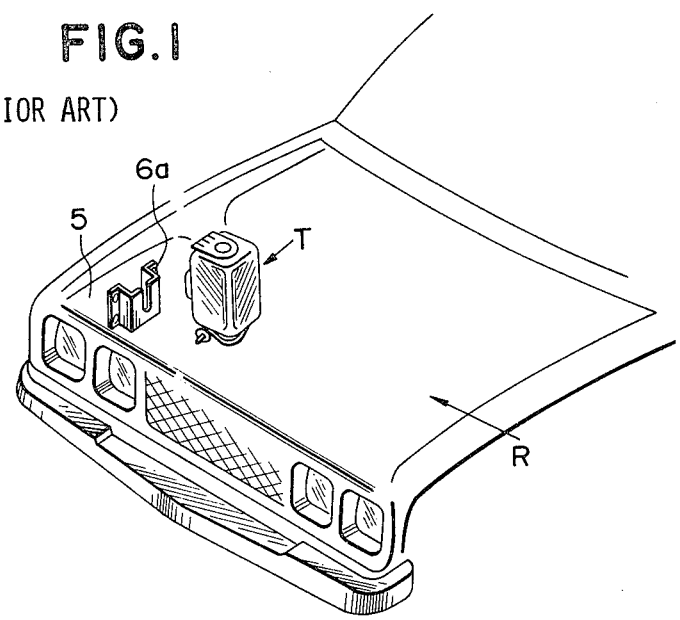
FIG. 1 is a schematic perspective view showing a conventional structure for fitting a window washer tank in an engine compartment of an automotive vehicle.
Figure 2:
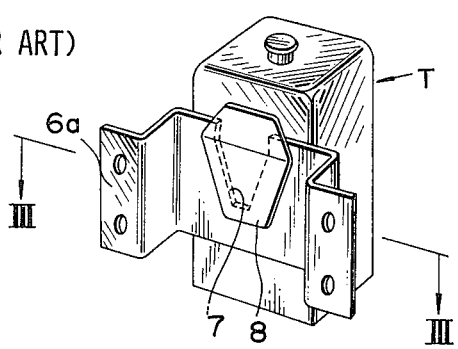
FIG. 2 is an enlarged perspective view of the fitting bracket and tank as shown in FIG. 1.
Figure 3:
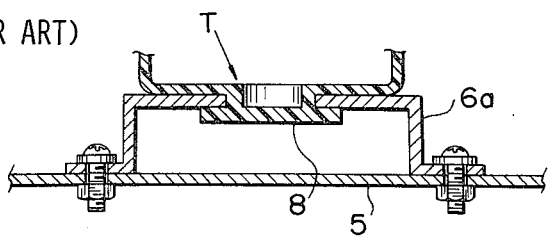
FIG. 3 is a sectional view showing the conventional fitting structure taken along the line III—III in FIG. 2.
Figure 4:
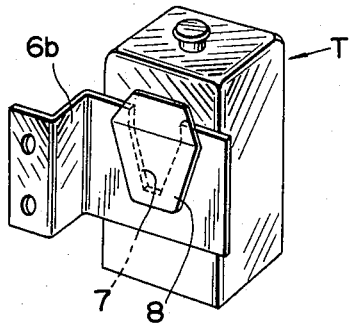
FIG. 4 is a perspective view showing a further conventional structure for fitting a resin tank in which it is combined with a fitting bracket.
Figure 5:
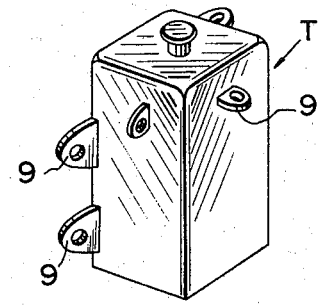
FIG. 5 is a perspective view showing still a further conventional fitting structure for a resin tank.
Figure 10:
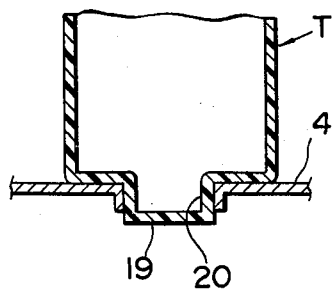
FIG. 10 is a sectional view showing the lower portion and its related construction according to a fourth embodiment of the present invention.

FIG. 10 illustrates a fourth embodiment of the present invention. The tank T has at its bottom a projection 19 for positioning the location of the tank T in its lateral and longitudinal directions when the projection 19 is inserted into a coupling hole 20 formed in the horizontal wall 4, for example, such as the hood ledge 10 (FIG. 1).

In the embodiments of FIGS. 9 and 10, the tank T may be pressed downwards by bracket means in the same manner as in the first and second embodiments.

According to the present invention, a tank made of a synthetic resin or the like can be easily set in position within an engine compartment if an area corresponding to the bottom of the tank is secured on a fixed member. The tank is positioned at its lower portion relative to the vehicle body and held resiliently at its top portion by bracket means. Thus, the tank can be stably fitted. Also, a restricted space within the engine compartment can be effectively utilized.

In case the upper portion of the tank T is held resiliently by the bracket 1 the lower end of which is inserted into the hole formed on the fixed member relative to the vehicle body and the intermediate portion of which is fixed by the screw, the oscillation or vibration of the upper portion of the tank can be avoided and prevented from dispositioning upwards so that the bracket 1 can be made small. In addition, if the bracket 1 is made of a piano wire, leaf spring, synthetic resin plate or the like, when the tank T is arranged in the engine compartment R, the fitting structure according to the present invention can easily absorb relative positioning errors among the positioning bracket 3, the other bracket 1 and others. Therefore, the precision of the brackets 1 and 3, the tank T, and others is not so severally required. As a result, the cost of production and fitting of those parts can be remarkably decreased.

The present invention may be embodied in other ways without departing from the spirit or essential character thereof. For instance, the positioning bracket can be fixed to a vertical wall or others in place of the horizontal wall. Also, the present invention can be applied to not only a window washer tank but also a reserve tank for engine-cooling water, a head lamp washer tank and other tanks. In addition, means other than those described and illustrated herein as a fixing or fitting member will readily suggest themselves to those skilled in the art.

What is claimed is:

1. A structure for fitting a tank in an engine compartment of a vehicle body, comprising:
   a bracket for fixing the tank at its top portion relative to the vehicle body; and
   means for positioning the tank at its bottom portion in its longitudinal and lateral directions relative to the vehicle body;
   the bracket having a bottom end thereof engaged with an engaging portion provided in a portion of the vehicle body, an intermediate portion thereof fixed on a portion of the vehicle body, and a top end thereof adapted to sit on the top of the tank.

2. A structure as defined in claim 1 wherein the bracket is made of a rod, and the top end thereof is to be engaged with a projection formed on the top of the tank.

3. A structure as defined in claim 1 wherein the bracket is made of a plate, and the top end thereof is formed in a T-shaped so as to be resiliently engaged with a pair of projections formed on the top of the tank.

4. A structure as defined in claims 2 or 3 wherein the bottom end of the bracket is inserted into a hole formed on a portion of the vehicle or a fixed member on the vehicle.

5. A structure as defined in claim 1 wherein the positioning means includes a positioning bracket both ends of which are bent to form an erecting portion, respectively, for holding therebetween the bottom portion of the tank so that the tank is positioned in a direction, each erecting end of the bracket being forked so as to hold thereat a projection formed on each side of the tank so that the tank is positioned in another direction.

6. A structure as defined in claim 1 wherein the positioning means includes bracket means fixed relative to the vehicle body for fixing the bottom portion of the tank.

7. A structure as defined in claim 1 wherein the tank has at its bottom a projection, and the positioning means includes a fixed member having a coupling hole into which the projection of the tank is inserted thereby to position the tank.

8. A structure for fitting a tank in an engine compartment of a vehicle body, comprising:

a bracket fixed to a portion of the vehicle body for fixing a top portion of the tank relative to the vehicle body;

the bracket having a bottom end thereof engaged with an engaged portion provided in a portion of the vehicle body, an intermediate portion thereof fixed on a portion of the vehicle body, and a top end thereof adapted to sit on the top of the tank; and means for positioning the bottom portion of the tank in the longitudinal and lateral directions of the vehicle body relative to the vehicle body in such a manner that the bottom portion of the tank is attached to the vehicle body in a detachable male-female relationship.

9. A structure as defined in claim 8 wherein the bracket is made of a rod and the top end thereof is resiliently engaged with a projection formed on the top of the tank.

10. A structure as defined in claim 8 wherein the bracket is made of a plate, and the top end thereof is formed in a T-shaped so as to be resiliently engaged with a pair of projections formed on the top of the tank.

11. A structure as defined in claims 9 or 10 wherein the bottom end of the bracket is inserted into a hole formed on a portion of the vehicle or a fixed member on the vehicle.

12. A structure as defined in claim 8 wherein the positioning means includes a positioning bracket, both ends of which are bent to form an erecting portion, respectively, for holding therebetween the bottom portion of the tank so that the tank is positioned in a direction, each erecting end of the bracket being forked so as to hold thereat a projection formed on each side of the tank so that the tank is positioned in another direction.

* * * * *